United States Patent
Vincenzo F.

(10) Patent No.: US 7,357,403 B2
(45) Date of Patent: Apr. 15, 2008

(54) FORK TREE UPPER CLAMP

(76) Inventor: Costa Vincenzo F., 15572 Computer La., Huntington Beach, CA (US) 92649

( * ) Notice: Subject to any disclaimer, the term of this patent is extended or adjusted under 35 U.S.C. 154(b) by 392 days.

(21) Appl. No.: 11/138,811

(22) Filed: May 26, 2005

(65) Prior Publication Data
US 2006/0279062 A1 Dec. 14, 2006

(51) Int. Cl.
*B62K 25/08* (2006.01)
(52) U.S. Cl. .................. 280/276; 280/279
(58) Field of Classification Search ........ 280/280, 280/276, 279; 180/218, 219
See application file for complete search history.

(56) References Cited

U.S. PATENT DOCUMENTS

| | | | | |
|---|---|---|---|---|
| 4,565,384 A * | 1/1986 | Dehnisch | .................... | 280/279 |
| 6,095,542 A * | 8/2000 | Allen | .................... | 280/276 |
| 6,976,691 B1 * | 12/2005 | Song et al. | .................. | 280/279 |
| 6,983,949 B2 * | 1/2006 | Ueno et al. | .................. | 280/279 |
| 7,093,844 B2 * | 8/2006 | Horiuchi | .................... | 280/279 |
| 7,121,568 B2 * | 10/2006 | Law | .................... | 280/280 |
| 7,222,869 B2 * | 5/2007 | Chen | .................... | 280/280 |
| 2005/0140114 A1 * | 6/2005 | Lederer | .................... | 280/280 |

* cited by examiner

Primary Examiner—Tony H. Winner
(74) Attorney, Agent, or Firm—Clement Cheng

(57) ABSTRACT

A fork tree upper clamp has a pair of leg holders, a frame holder and a pair of brake line channels formed in the lower surface. The leg holder can have a shelf for abutting a top end of a hollow fork leg, so that the shelf defines a well having a connecting aperture allowing the brake line to pass from the brake line channel to the well. The clamp can be of a generally planar configuration made of a thick slab of solid aluminum that is CNC milled and then finished. Each brake line channel can terminate at a terminating recess.

17 Claims, 3 Drawing Sheets

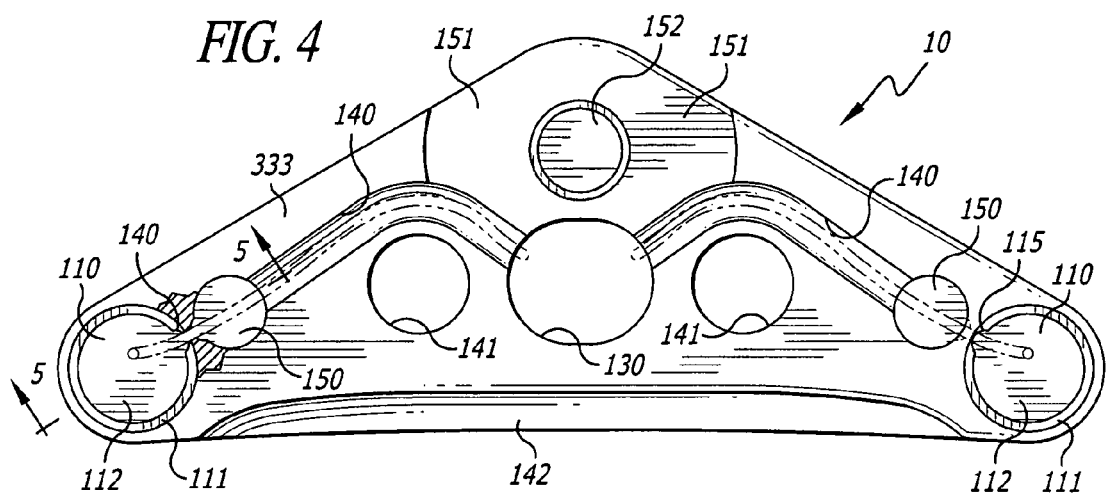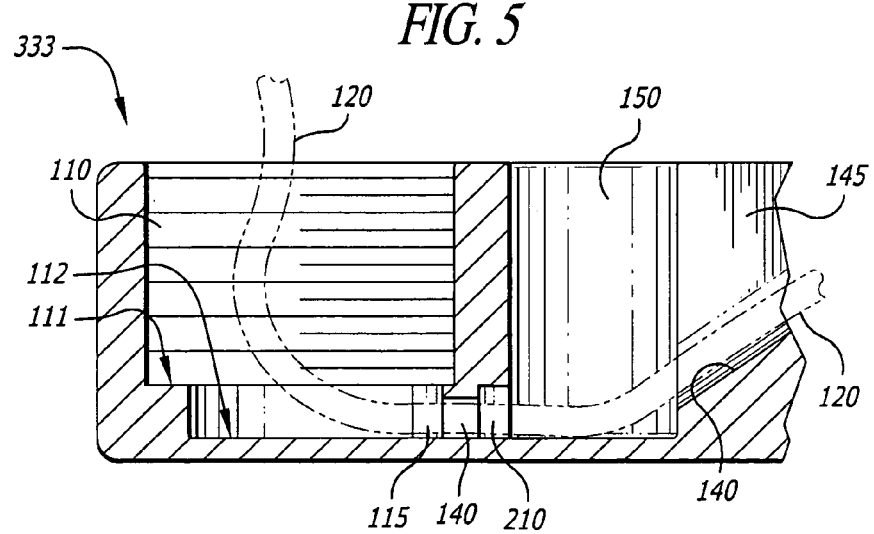

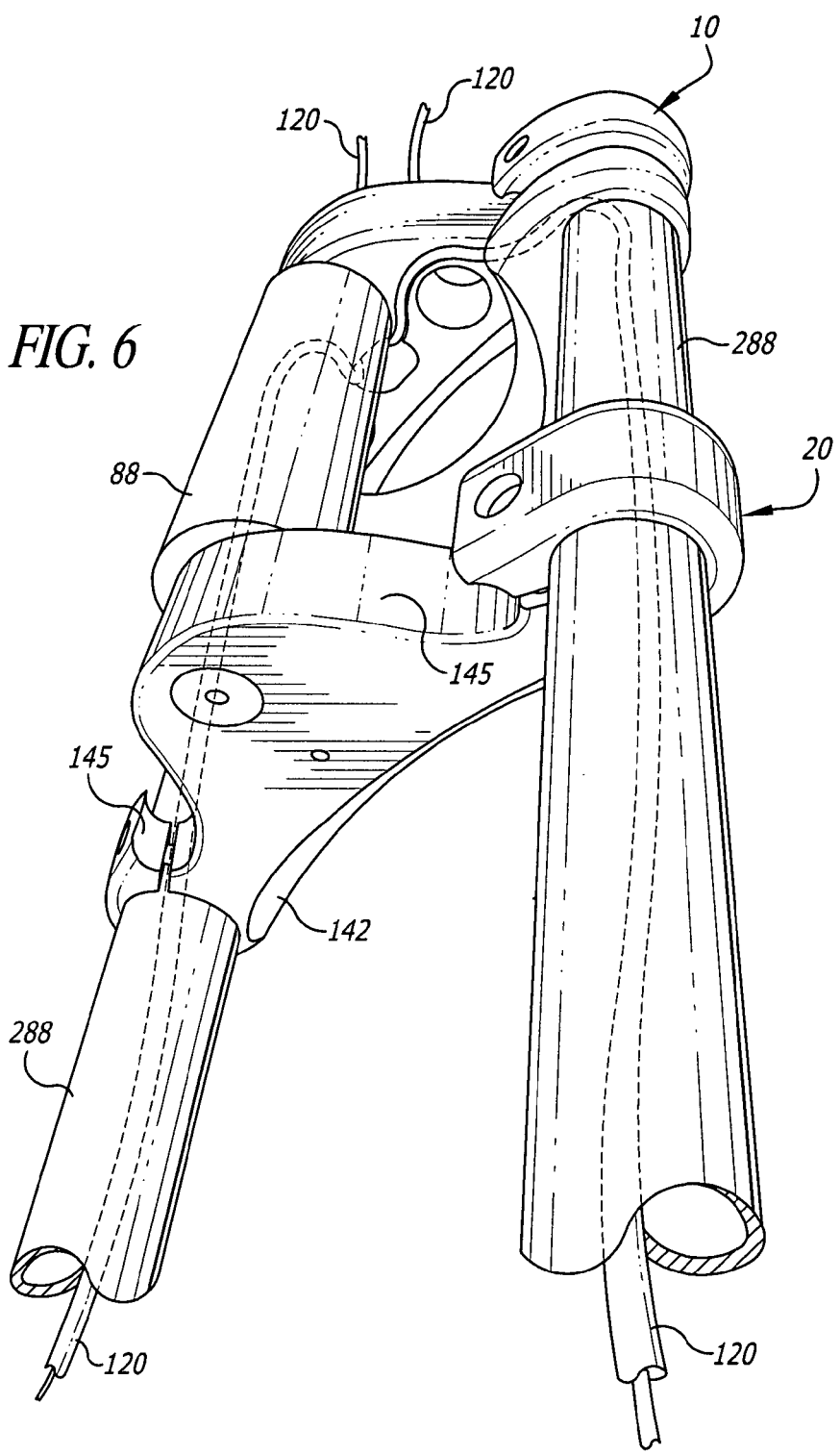

FORK TREE UPPER CLAMP

DISCUSSION OF RELATED ART

Motorcycles have a fork tree assembly connecting the frame to fork legs holding a steering axle. Fork trees, also known as a triple clamps on motorcycles, have been used in a wide variety of two wheeled vehicles including bicycles as seen in U.S. Pat. No. 5,257,553 granted to Cheng the disclosure of which is incorporated herein by reference. Dual piston rods are held in the front fork assembly as seen in U.S. Pat. No. 5,829,773 to Rajaee the disclosure of which is incorporated herein by reference. By reference to prior art, current fork trees are called triple clamps because they hold a pair of motorcycle suspensions in two clamping locations while holding the frame of the motorcycle in the third clamping location. The fork tree comprises an upper clamping tree member, and a lower clamping tree member.

Prior art motorcycle fork trees such as the type patented in U.S. Pat. No. 4,565,384 granted to Dehnisch describes the typical assembly, the disclosure of which is incorporated herein by reference.

"A motorcycle fork tree assembly includes a steering axle attached to a top tree piece and a bottom inner tree piece. The bottom inner tree piece is pivotally secured to a bottom intermediate tree piece which is adjustably positioned within a bottom outer tree piece. The fork tubes extend through the bottom outer tree piece and are attached to the top tree piece via plugs having offset bores positioned in one of a number of threaded holes of the top tree piece. The degree of trail of the steering assembly for the motorcycle can be easily and quickly adjusted by the independent adjustment of one or more of the bottom outer tree piece relative to the bottom inner tree piece or the plugs in the top tree piece."

Unfortunately, the Dehnisch prior art assembly, while allowing easy access to components requires many parts and externally visible bores creating an unnecessarily complicated construction and unnecessarily complicated external appearance. Also, much of the prior art does not provide a simplified upper surface of an upper fork tree clamp.

BRIEF DESCRIPTION OF THE DRAWINGS

FIG. 4 is a bottom view.

FIG. 5 is a cross section view.

FIG. 6 is a perspective environmental view.

DETAILED DESCRIPTION OF THE PREFERRED EMBODIMENT

It is an object of the current invention to minimize external design complexity of the apparent upper surface of the fork tree upper clamp without sacrificing function.

Figure 1:
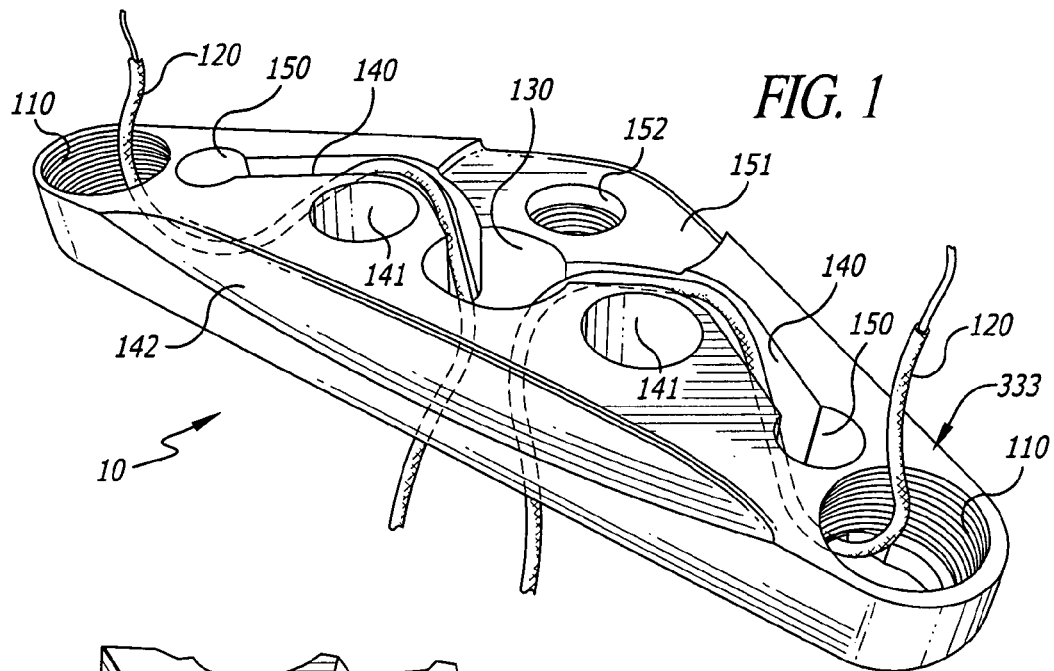
FIG. 1 is a perspective view of the bottom of the fork tree upper clamp.

According to FIG. 1 of the present invention, a perspective view shows the lower surface of the upper clamp 10. The upper clamp 10 comprises a pair of threaded leg holders 110. The leg holders each hold a top end of a single fork leg. The clamp is preferably made of a thick slab of solid aluminum that is CNC milled and then finished.

A pair of brake lines 120 pass from the central aperture 130 along a pair of brake line channels 140. The central aperture leads up into the handlebar portion of the motorcycle. The brake lines are preferably hydraulic. The brake line channels are cut into the fork leg upper portion preferably with a CNC router allowing a cut perpendicular to the generally planar configuration of the upper clamp 10.

The brake line channels 140 optionally curve around handlebar mounting apertures 141 terminating at terminating recesses 150 preferably cylindrical and cut to the apex level of the brake line. Optionally, the leg maybe styled by a variety of decorative cuts such as the cut 142. The frame of the motorcycle is attached to a threaded frame mounting hole 152 also called the frame holder. The attachment area of the frame 151 is preferably recessed allowing a frame having a circular cross section and cylindrical shape to partially cover the brake line 120 and the brake line channels 140. The area showing in figure one faces down hiding the elements in the current invention when the motorcycle is assembled.

Figure 2:
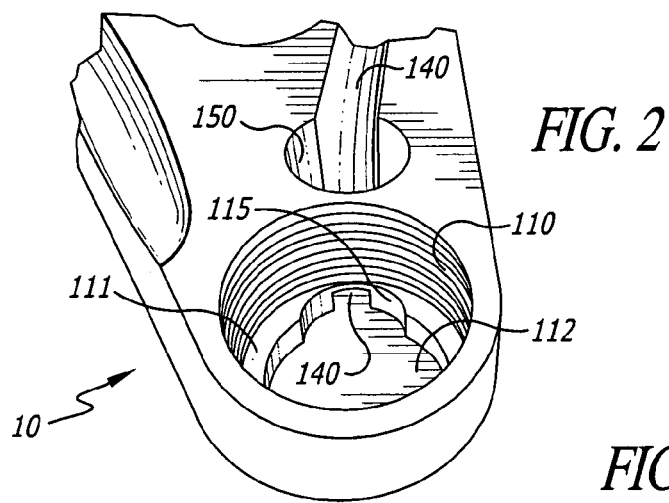
FIG. 2 is a close up front perspective view of the brake line channel.
Figure 3:
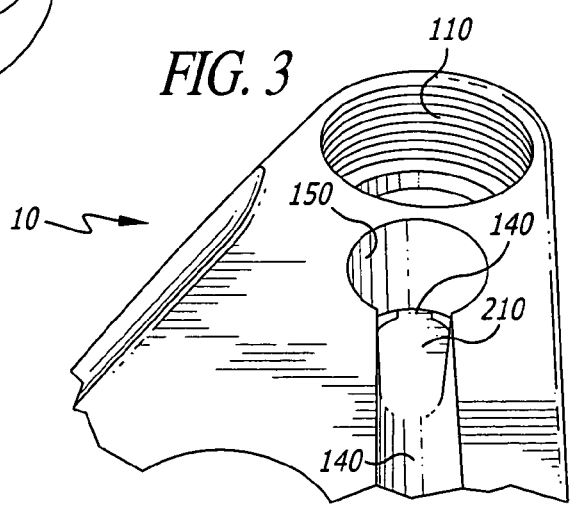
FIG. 3 is a close up rear perspective view of the brake line channel.

FIG. 2 shows a frontal perspective view of the present invention 10 along the path of the brake line channel 140. The threaded leg holder 110 formed as a threaded hole has a shelf 111 circumscribing and defining a well 112 that connects to the groove shaped brake line channel 140 allowing passage of the brake line into the well 112. The shelf 111 abuts the end of the wall of the hollow cylindrical fork leg. The brake line passes through the hollow portion of the cylindrical leg. The fork leg has an aperture at the terminal end much like a pipe end. The brake line passage 140 is cut into the shelf 111. The passage around the threaded leg holder 110 is formed by a first cylindrical keyway cut 115. The first cylindrical key way cut 115 meets the terminating recess 150. FIG. 3, shows a rear perspective view of the present invention along the path of the brake line channel 140. The second cylindrical key way cut is formed by inserting the keyway cutter into the terminating recess 150 making a second key way cut 210 also meeting the first key way cut 115 forming brake line passage 140. Although the key way cut is described in the preferred embodiment, the connecting aperture 140 can be created by a variety of means.

FIG. 4 shows the bottom view of the present invention 10. The upper clamp 10 has functional machining only on the bottom face 333 shown in FIG. 4. The upper surface can be unornamented allowing a predominance of clean and simple lines during construction. The features and elements shown in the bottom view of the present invention are perpendicular aligned to the generally planar configuration of the upper clamp 10. For example, the terminating recess 150 is machined as a well with a flat terminating surface. The leg holder 110 can also be machined perpendicular to the bottom face shown in FIG. 4. The handlebar holes 141 are machined so that they are apertures passing through the entire thickness of the upper clamp 10.

Analogously, the central aperture 130 is machined so it passes through the entire thickness of the upper clamp 10. The channels 140 can also be cut from the same side forming depressions with walls perpendicular to the bottom face. The channels are preferably cut with a continuous vertical profile cradling the brake line along the length of the brake line from the central aperture 130 along the brake line channel 140 to the cylindrical terminating recess 150. A continuous vertical profile allows continuous contact of the brake line with the brake line channel 140 of the upper clamp 10. When handlebar mounting apertures 141 are between the central aperture 130 and terminating recesses 150 the brake line channels 140 curve around handlebar mounting apertures 141 to the terminating recesses 150.

A cutaway figure of FIG. 4 produces cross-section FIG. 5 displaying the passage of the brake line 120 through the brake line channel 140. The sidewall 145 of the brake line channel 140 appears perpendicular to the bottom face of the upper clamp 10. The brake line 120 approaches the bottom of the terminating recess 150 in a gentle slope. The first cut 115 is matched by the second cut 210 forming the continuation of the brake line passage 140.

FIG. 6 shows a motorcycle upper clamp device as mounted and assembled. The frame 88 and the fork legs 288 are clamped between an upper clamp 10 and a lower clamp 20. Ornamental grooves 145, 142 can be cut into either upper or lower clamps. FIG. 6 shows the apex level of the brake line that is where the brake line rises to the highest point above the well before passing down through the hollow fork tube.

The invention claimed is:

1. A fork tree upper clamp comprising:
   a. a pair of leg holders formed in a lower surface;
   b. a frame holder formed in the lower surface; and
   c. a pair of brake line channels formed as grooves in the lower surface; further comprising
   d. terminating recesses, wherein each brake line channel terminates at a terminating recesses.

2. The fork tree upper clamp device of claim 1 wherein a leg holder has a shelf for abutting a top end of a hollow fork leg, wherein the shelf defines a well having a connecting aperture allowing the brake line to pass from the brake line channel to the well.

3. The fork tree upper clamp device of claim 1 wherein the clamp is of a generally planar configuration made of a thick slab of solid aluminum that is CNC milled and then finished.

4. The fork tree upper clamp device of claim 1 further comprising a fork tube holding the brake line passing though the channel through the fork tube.

5. The fork tree upper clamp device of claim 1 wherein terminating recesses are cylindrical and cut to the apex level of the brake line.

6. The fork tree upper clamp device of claim 1 further comprising handlebar mounting apertures between the central aperture and terminating recesses wherein the brake line channels curve around the handlebar mounting apertures.

7. The fork tree upper clamp device of claim 1 wherein a leg holder has a shelf for abutting a top end of a hollow fork leg, wherein the shelf defines a well having a connecting aperture allowing the brake line to pass from the brake line channel to the well.

8. The fork tree upper clamp device of claim 7 wherein the pair of brake line channels formed as grooves in the lower surface.

9. A fork tree upper clamp comprising:
   a. a pair of leg holders formed in a lower surface;
   b. a frame holder formed in the lower surface; and
   c. a brake line channel formed as a groove in the lower surface; further comprising
   d. terminating recesses, wherein the brake line channel terminates at a terminating recesses.

10. The fork tree upper clamp device of claim 9 wherein a leg holder has a shelf for abutting a top end of a hollow fork leg, wherein the shelf defines a well having a connecting aperture allowing the brake line to pass from the brake line channel to the well.

11. The fork tree upper clamp device of claim 9 wherein the clamp is of a generally planar configuration made of a thick slab of solid aluminum that is CNC milled and then finished.

12. The fork tree upper clamp device of claim 9 wherein terminating recesses are cylindrical and cut to the apex level of the brake line.

13. The fork tree upper clamp device of claim 9 further comprising handlebar mounting apertures between the central aperture and terminating recesses wherein the brake line channel curves around the handlebar mounting apertures.

14. The fork tree upper clamp device of claim 9 wherein a leg holder has a shelf for abutting a top end of a hollow fork leg, wherein the shelf defines a well having a connecting aperture allowing the brake line to pass from the brake line channel to the well.

15. The fork tree upper clamp device of claim 9 further comprising a fork tube holding the brake line passing though the channel through the fork tube.

16. The fork tree upper clamp device of claim 15 further comprising a fork tube holding the brake line that passes though the channel and the fork tube.

17. The fork tree upper clamp device of claim 15 wherein the brake line channel is formed as a groove in the lower surface.

* * * * *